July 19, 1927.

F. A. STEVENS 1,636,334

OPHTHALMIC MOUNTING

Filed July 3, 1922

Inventor:-
Frederick A. Stevens.
By David Rines
Attorney:-

Patented July 19, 1927.

1,636,334

UNITED STATES PATENT OFFICE.

FREDERICK A. STEVENS, OF PROVIDENCE, RHODE ISLAND, ASSIGNOR, BY MESNE ASSIGNMENTS, TO BAUSCH AND LOMB OPTICAL COMPANY, OF ROCHESTER, NEW YORK, A CORPORATION OF NEW YORK.

OPHTHALMIC MOUNTING.

Application filed July 3, 1922. Serial No. 572,435.

The present invention relates to ophthalmic mountings, more particularly to mountings of the combination metal-and-composition type, and to methods of making the same.

In Patent No. 1,600,605, granted September 21, 1926, and in copending application, Serial No. 459,940, filed April 9, 1921, there are disclosed ophthalmic mountings of the above-described character in which the lens is adapted to rest against the metal rim and in which the use of additional retaining elements, such as screws, pins, clips and the like, is avoided, the non-metallic rim being simply snapped or sprung over the metal rim, the elemental rims being previously so shaped as to permit of their assembly in this manner.

The chief object of the present invention is to reduce the cost of manufacture of ophthalmic mountings of the type disclosed and claimed in the aforesaid patent and application.

Figure 1:
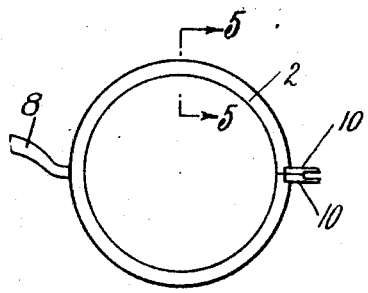
Figure 2:
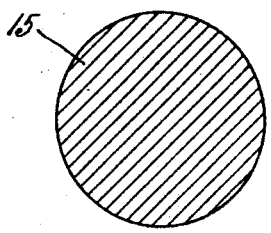
Figure 3:
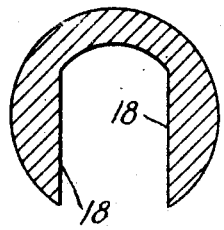
Figure 4:
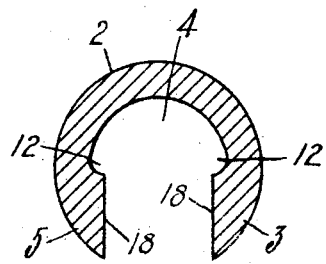
Figure 5:
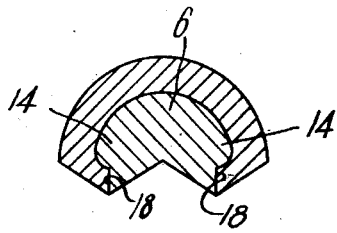
Figure 6:
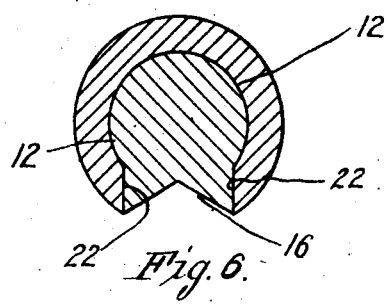

In the accompanying drawings, Fig. 1 is an elevation of a portion of an ophthalmic mounting constructed according to a preferred embodiment of the present invention; Figs. 2, 3 and 4 are cross-sections illustrating the improved method of the present invention; Fig. 5 is a section taken upon the line 5—5 of Fig. 1; and Fig. 6 is a similar section of a modification.

As in the mountings of the above-named patent and application, the ophthalmic mounting of the present invention comprises a non-metallic rim 2 having an annular slot 4 that divides the rim 2 into wings 3 and 5. Within the slot is seated a metal rim 6 to which is secured a bridge 8 of a spectacle or eyeglass frame. A spectacle frame has been chosen to illustrate the invention and accordingly temple end pieces 10 are shown affixed to the ends of the split metal rim 6. The wall of the slot 4 is shaped to conform to the exterior surface of the metal rim 6 so that the rim 6 may occupy substantially all the space of the slot 4. A tight joint between the metal and the non-metallic rims is thereby provided. Annular recesses 12 are provided upon one of the rims adjacent to the interior walls of the slot and annular ribs 14 that are provided upon the other rim are seated within the recesses to lock the rims together. The non-metallic material is sufficiently resilient to adapt the wings 3 and 5 to yield or spring outwardly when the metal rim is forced into the slot 4, thereby permitting the ribs 14 to become seated in the recesses 12 of the slot 4. The forcing action need be but momentary, the wings 3 and 5 immediately springing back into position, upon the ribs becoming seated, so that no permanent strain is imposed upon the wings 3 and 5 by the operation.

The non-metallic rim 2 is made from non-metallic rods 15, Fig. 2, the slot 4 being skived or otherwise cut into the rods. The molecular condition of the non-metallic material is by this method of construction retained unimpaired, so that there will be no tendency for the non-metallic rim 2 to work away from the metal rim after it is mounted in position thereover. But skiving slots of the desired shape in material like celluloid, zylonite and the like is attended with some difficulty.

According to the present invention, the desired result is attained in a series of successive skiving operations, as follows: First, a slot having plane parallel walls 18 is cut longitudinally into the rod, Fig. 3. The plane parallel walls are then cut into to produce the recesses 12. The recesses 12 may be circular, and they may merge into each other to form a slot of generally circular cross section, as shown in Fig. 6. The inner metal rim 6 is then mounted in the slot, as above described. As the metal rim is shaped to conform to the slot, its lens-receiving groove 16 is of narrower width than the largest cross-sectional width of the metal rim, the groove being joined to the portion of largest cross-sectional width by plane, parallel walls 22 that contact against the remaining portions of the plane, parallel walls 18.

In the preferred construction, illustrated in Figs. 4 and 5, the portions of the recesses 12 near the plane parallel walls 18 are of gradually decreasing radius to produce a tighter seating effect of the metal rim within the non-metallic rim.

It will be understood that the invention is not limited to the exact structural details herein shown and described, but that modifications may be made therein within the skill of the artisan without departing from its spirit and scope as defined in the appended claims.

The invention having been thus described, what is claimed as new is:

1. The method of making a non-metallic article of the class described that comprises cutting a longitudinal slot in a non-metallic rod, and cutting into a wall of the slot to increase the width of the slot.

2. The method of making an ophthalmic mounting that comprises cutting a longitudinal slot in a non-metallic rod, and cutting into the walls of the slot to increase the width of the slot.

3. The method of making an ophthalmic mounting that comprises cutting a longitudinal slot in a non-metallic rod, cutting into the walls of the slot to increase the width of the slot, and mounting in the slot a metal rim shaped to conform to the slot.

4. An ophthalmic mounting having, in combination, an inner metal rim having an inner lens-receiving groove of narrower width than the largest cross-sectional width of the rim, the groove being joined to the portion of largest cross-sectional width by plane, parallel walls, and the portion of largest cross-sectional width being circular in cross section, and a split outer rim constituted of resilient, non-metallic material having an inner annular slot within which the metal rim is seated, the wall of the slot being shaped to conform to the exterior surface of the metal rim, and the wings of the non-metallic rim being adapted to yield resiliently during the seating of the metal rim within the slot.

5. An ophthalmic mounting having, in combination, an inner metal rim having an inner lens receiving groove of narrower width than the largest cross-sectional width of the rim, the groove being joined to the portion of largest cross-sectional width by plane, parallel walls, the portion of largest cross-sectional width being circular in cross section, and the portions near the plane, parallel walls being of gradually decreasing radius, and a split outer rim constituted of resilient, non-metallic material having an inner annular slot within which the metal rim is seated, the wall of the slot being shaped to conform to the exterior surface of the metal rim, and the wings of the non-metallic rim being adapted to yield resiliently during the seating of the metal rim within the slot.

6. An ophthalmic mounting having, in combination, an inner metal rim having an inner lens-receiving groove of narrower width than the largest cross-sectional width of the rim, the groove being joined to the portion of largest cross-sectional width by plane, parallel walls, and the portion of largest cross-sectional width being circular in cross section, and a split outer rim constituted of non-metallic material having an inner annular slot within which the metal rim is seated, the wall of the slot being shaped to conform to the exterior surface of the metal rim.

7. An ophthalmic mounting having, in combination, an inner metal rim having an inner lens-receiving groove of narrower width than the largest cross-sectional width of the rim, the groove being joined to the portion of largest cross-sectional width by plane walls, the portion of largest cross-sectional width being curved in cross section, and the portions near the plane walls being of gradually decreasing radius, and a split outer rim constituted of non-metallic material having an inner annular slot within which the metal rim is seated, the wall of the slot being shaped to conform to the exterior surface of the metal rim.

8. An ophthalmic mounting having, in combination, an inner metal rim having an inner lens-receiving groove of narrower width than the largest cross-sectional width of the rim, the groove being joined to the portion of largest cross-sectional width by walls, and a split outer rim constituted of resilient, non-metallic material having an inner annular slot within which the metal rim is seated, the wall of the slot being shaped to conform to the exterior surface of the metal rim and the wings of the non-metallic rim being adapted to yield resiliently during the seating of the metal rim within the slot.

In testimony whereof, I have hereunto subscribed my name this 27th day of June, 1922.

FREDERICK A. STEVENS.